(12) United States Patent
Choi et al.

(10) Patent No.: US 7,707,644 B2
(45) Date of Patent: *Apr. 27, 2010

(54) APPARATUS AND METHOD FOR REPORTING OPERATION STATE OF DIGITAL RIGHTS MANAGEMENT

(75) Inventors: Yang-lim Choi, Seongnam-si (KR); Jung-yon Cho, Seoul (KR); Young-chul Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1425 days.

This patent is subject to a terminal disclaimer.

(21) Appl. No.: 11/068,937

(22) Filed: Mar. 2, 2005

(65) Prior Publication Data

US 2005/0198693 A1 Sep. 8, 2005

Related U.S. Application Data

(60) Provisional application No. 60/548,888, filed on Mar. 2, 2004.

(30) Foreign Application Priority Data

Apr. 2, 2004 (KR) ............ 10-2004-0022882

(51) Int. Cl.
*G06F 7/04* (2006.01)
*G06F 17/30* (2006.01)
*H04N 7/16* (2006.01)

(52) U.S. Cl. ............... 726/27; 726/6; 705/58; 713/164

(58) Field of Classification Search ............ 726/6, 726/27, 29; 705/58; 713/164
See application file for complete search history.

(56) References Cited

U.S. PATENT DOCUMENTS 5,371,794 A * 12/1994 Diffie et al. ............ 713/156

(Continued)

FOREIGN PATENT DOCUMENTS

DE 102 54 747 A1 2/2004

(Continued)

OTHER PUBLICATIONS

Kyung-Ah Chang et al: "Multimedia rights management for the multiple devices of end-user", Multimedia Signal Processing, 2002 IEEE Workshop on Dec. 9-11, 2002, Piscataway, NJ, USA, IEEE, May 19, 2003, pp. 640-645, XP010642443.

(Continued)

*Primary Examiner*—David García Cervetti
(74) *Attorney, Agent, or Firm*—Sughrue Mion, PLLC

(57) ABSTRACT

A method and apparatus for reporting the operation state of digital rights management are provided. In a home network formed with control devices and a control point, the apparatus for reporting the operation state of digital rights management of the control device to the control point includes: a digital rights management (DRM) module which performs digital rights management; a state variable generation unit which receives DRM operation state information indicating the state of a DRM process currently operating, from the DRM module, and based on the received DRM state information, generates DRM state variables; and a universal plug and play (uPnP) module which by using a uPnP protocol, transmits the generated state variables to the control point.

29 Claims, 6 Drawing Sheets

U.S. PATENT DOCUMENTS

| | | | |
|---|---|---|---|
| 6,697,944 B1* | 2/2004 | Jones et al. | 713/168 |
| 7,024,393 B1* | 4/2006 | Peinado et al. | 705/59 |
| 7,206,765 B2* | 4/2007 | Gilliam et al. | 705/51 |
| 7,254,608 B2* | 8/2007 | Yeager et al. | 709/203 |
| 7,254,719 B1* | 8/2007 | Briceno | 713/194 |
| 7,343,014 B2* | 3/2008 | Sovio et al. | 380/278 |
| 2002/0002674 A1* | 1/2002 | Grimes et al. | 713/156 |
| 2003/0028488 A1* | 2/2003 | Mohammed et al. | 705/59 |
| 2003/0105778 A1* | 6/2003 | Andani | 707/200 |
| 2003/0115147 A1* | 6/2003 | Feldman et al. | 705/64 |
| 2003/0135465 A1* | 7/2003 | Lee et al. | 705/51 |
| 2003/0149668 A1* | 8/2003 | Lee et al. | 705/51 |
| 2003/0188183 A1* | 10/2003 | Lee et al. | 713/200 |
| 2003/0229900 A1 | 12/2003 | Reisman | 725/87 |
| 2004/0006542 A1* | 1/2004 | Gilliam et al. | 705/51 |
| 2004/0034582 A1* | 2/2004 | Gilliam et al. | 705/31 |
| 2004/0039704 A1* | 2/2004 | Gilliam et al. | 705/50 |
| 2004/0062400 A1* | 4/2004 | Sovio et al. | 380/286 |
| 2004/0088175 A1* | 5/2004 | Messerges et al. | 705/1 |
| 2004/0088348 A1* | 5/2004 | Yeager et al. | 709/202 |
| 2004/0117666 A1* | 6/2004 | Lavender et al. | 713/202 |
| 2004/0117667 A1* | 6/2004 | Lavender et al. | 713/202 |
| 2004/0158712 A1* | 8/2004 | Lee et al. | 713/165 |
| 2005/0066163 A1* | 3/2005 | Ikenoya | 713/156 |
| 2005/0086532 A1* | 4/2005 | Lotspiech et al. | 713/201 |
| 2005/0120216 A1* | 6/2005 | Lee et al. | 713/171 |
| 2005/0168323 A1* | 8/2005 | Lenoir et al. | 340/5.74 |
| 2005/0210261 A1* | 9/2005 | Kamperman et al. | 713/182 |
| 2006/0020784 A1* | 1/2006 | Jonker et al. | 713/157 |
| 2006/0021065 A1* | 1/2006 | Kamperman et al. | 726/28 |
| 2006/0041891 A1* | 2/2006 | Aaron | 719/315 |
| 2006/0075424 A1* | 4/2006 | Talstra et al. | 725/25 |
| 2006/0080726 A1* | 4/2006 | Bodlaender et al. | 726/2 |
| 2006/0095628 A1* | 5/2006 | Ludwig et al. | 710/302 |
| 2006/0168126 A1* | 7/2006 | Costa-Requena et al. | 709/219 |
| 2006/0212400 A1* | 9/2006 | Kamperman et al. | 705/51 |
| 2006/0218650 A1* | 9/2006 | Costa-Requena et al. | 726/27 |
| 2006/0277598 A1* | 12/2006 | Ahn | 726/5 |
| 2007/0150891 A1* | 6/2007 | Shapiro | 717/174 |
| 2007/0157295 A1* | 7/2007 | Mangalore et al. | 726/6 |
| 2007/0199075 A1* | 8/2007 | Skoric et al. | 726/27 |
| 2008/0141242 A1* | 6/2008 | Shapiro | 717/174 |

FOREIGN PATENT DOCUMENTS

| | | |
|---|---|---|
| JP | 2000-222363 A | 8/2000 |
| JP | 2004-302835 A | 10/2004 |
| KR | 2002-0019806 A | 3/2002 |
| KR | 2002-0064672 A | 8/2002 |
| KR | 2004-0006027 A | 1/2004 |
| KR | 10-2004-0013465 A | 2/2004 |
| KR | 10-2004-0055446 A | 6/2004 |
| WO | WO 2004/017664 A1 | 2/2004 |

OTHER PUBLICATIONS

Walker J et al: "Share it—the architecture of a rights-managed network of peer-to-peer set-top-boxes", EUROCON 2003. Computer as a Tool. The IEEE Region 8 Sep. 22-24, 2003, Piscataway, NJ, USA, IEEE, vol. 1, Sep 22, 2003, pp. 251-255, XP010671321.

* cited by examiner

APPARATUS AND METHOD FOR REPORTING OPERATION STATE OF DIGITAL RIGHTS MANAGEMENT

This application claims the priority of Korean Patent Application No. 2004-22882, filed on Apr. 2, 2004, in the Korean Intellectual Property Office, and U.S. Provisional Patent Application No. 60/548,888 filed on Mar. 2, 2004 in the United States Patent and Trademark Office, the disclosures of which are incorporated herein in their entirety by reference.

BACKGROUND OF THE INVENTION

1. Field of the Invention

The present invention relates to digital rights management (DRM), and more particularly, to an apparatus and method for reporting the operation state of digital rights management of a control device, to a control point in a home network.

2. Description of the Related Art

Home networking has been attracting increasingly more attention recently. A home network is formed with devices reproducing contents (movie, song, video game software) and devices for managing the contents reproducing devices, and is a network in which digital rights management is guaranteed by these devices.

Digital rights management includes a function for managing rights on devices belonging to a home network, and a function for managing rights on contents reproducible in a predetermined home network. Digital rights management is performed by an application program installed in a device belonging to a home network. Among digital rights management application programs being currently used, there are SmartRight suggested by Thomson, Open Conditional Content Access Management (OCCAM) suggested by Cisco Systems, xCP (extensible content protection) Cluster Protocol suggested by IBM, Digital Transmission Content Protection (DTCP) suggested by Digital Transmission License Administrator (DTLA).

In an ordinary digital rights management system, devices belonging to a home network are broken down into master devices and slave devices. A master device is a device that performs grant, change, revocation of digital rights on other devices and setting, change, and revocation of digital rights on contents existing in the home network. A slave device is a device which provides or reproduce contents according to digital rights granted by the master device. The slave devices are divided into media renderers that decode and reproduce contents and media sources that provide contents to the media renderers. Whether a device is a master device or a slave device is determined by the function performed by a DRM application program.

Meanwhile, in the recent home network systems, a universal plug and play (uPnP) protocol is used for communications between these master device and slave devices. The uPnP is a technology by which connection to and disconnection from a home network of a device forming the home network are automatically recognized such that the status as an element of the home network is automatically granted or revoked.

FIG. 1 is a diagram showing a home network according to a uPnP protocol.

The home network according to the uPnP protocol comprises control devices (CDs) and a control point (CP).

The CP 10 searches for CDs 20, 30 and 40 on the network, and by receiving advertisement messages generated when a device is newly connected to or disconnected from the home network, recognizes that the CD is newly connected to the home network. Also, the CP 10 receives the description message of each CD and event messages according to actions with CDs. Each action is defined by a markup language, for example, extensible markup language (XML).

When connected to or disconnected from the home network, one of the CDs 20, 30, and 40 sends an advertisement message to the CP 10 and sends a message confirming whether or not the CD is existing in the home network within a predetermined period. Also, the CDs 20, 30, and 40 respond to a variety of requests transmitted by the CP 10 according to the uPnP protocol. The CDs 20, 30, and 40 may be any one of a media source and a media renderer in the home network. In FIG. 1, paths 12, 14, 16 indicate message transmission and response performed between the CP 10 and CDs 20, 30, and 40, and paths 22, 32 indicate transmission and reception of contents between CDs 20, 30 and 40.

FIG. 2 is a diagram showing a structure in which contents transmission occurring between a CP and CDs is performed in digital rights management (DRM) using the uPnP.

The CP 210 comprises a uPnP module 212 which transmits messages to and receives responses to the messages from CDs according to the uPnP protocol, and a user interface 214 which receives a user input for message transmission and outputs results of message responses to the user. Generally, the CP 210 is a remote control device or a personal digital assistant (PDA), and has a display screen. In the aspect of contents reproduction, the CP 210 transfers contents search and reproduction commands from the user, to CDs according to the uPnP protocol and receives responses to the commands from CDs.

CDs are divided into media renderers and media sources according to whether the device is reproducing or providing contents.

The media source 220 comprises a uPnP module 222 which informs the CP 210 of its presence through an advertisement message by communicating with the uPnP module 212 of the CP 210, a DRM module 224 which performs digital rights management and provides contents to authorized CDs; and a contents DB 226 which stores contents.

The media renderer 230 comprises a uPnP module 232 which informs the CP 210 of its presence through an advertisement message by communicating with the uPnP module 212 of the CP 210; a DRM module 234, which performs digital rights management and receives authorized contents from a media source; and a contents reproduction unit 236 which decodes and reproduces received contents.

However, as shown in FIG. 2, while directly communicating with each other, the DRM module 224 of the media source 220 and the DRM module 234 of the media renderer 230 perform digital rights management. Accordingly, the CP 210 only recognizes error messages generating under the uPnP protocol. That is, the CP cannot know which operation of the DRM process the media source 220 or the media renderer 230 is performing, or whether or not the process being performed is successful.

In the conventional implementation as in FIG. 2, there is the problem that the user cannot recognize the operation state of the DRM modules. It is because communication between the CP and the CDs is performed through the uPnP modules, but communication between the media source and the media renderer is performed directly through the DRM modules.

This problem causes an additional problem that the user cannot smoothly deal with errors occurring during the DRM process.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a method for reporting the operation state of digital rights management (DRM), by which a user can recognize the operation state of the DRM process in a DRM system using a universal plug and play (uPnP) protocol.

According to an aspect of the present invention, there is provided an apparatus for reporting the operation state of digital rights management of a control device to a control point in a home network formed with the control device and the control point, the apparatus including a digital rights management (DRM) module which performs digital rights management; a state variable generation unit which receives DRM operation state information indicating the state of a DRM process currently operating, from the DRM module, and based on the received DRM state information, generates DRM state variables; and a universal plug and play (uPnP) module which by using a uPnP protocol, transmits the generated state variables to the control point.

The DRM state information may indicate any one of authentication beginning, authenticating, authentication failure, and authentication success by the DRM module. Also, the DRM state information may indicate any one of key processing, key processing failure, and key processing success by the DRM module.

At this time, when the control device is a media source, the DRM state information may be generated whenever contents in the media source are output to another control device, and when the control device is a media renderer, the DRM state information may be generated whenever contents in the media renderer are input to the media renderer or are rendered.

The state variable generation unit may generate: a not-authenticated state variable which indicates that the control device including the DRM module is turned on; a normal-operation state variable which indicates that the DRM module is normally operating; an authenticating state variable which indicates that an authentication operation by the DRM module is performed; and an authentication-failed state variable which indicates that the result of the authentication by the DRM module is a failure.

The state variable generation unit may further generate: a normal-operation state variable which indicates that the DRM module is normally operating; a key-processing state variable which indicates that a key processing operation by the DRM module is performed; and a key-processing-failure state variable which indicates that the key-processing operation by the DRM module is a failure.

The apparatus of claim 1 may further include a state variable storage unit which stores the state variables, in which, in response to a state variable search request of the control point, the uPnP module searches for a state variable stored in the state variable storage unit according to a uPnP protocol, and transmits the state variable to the control point.

According to another aspect of the present invention, there is provided a method for reporting the operation state of digital rights management of a control device to a control point in a home network formed with the control device and the control point, the method including: performing digital rights management; while the digital rights management is performed, generating DRM state information determining a DRM operation being currently operating; based on the DRM state information, generating a DRM state variable; and by using a uPnP protocol, transmitting the generated state variable to the control point.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
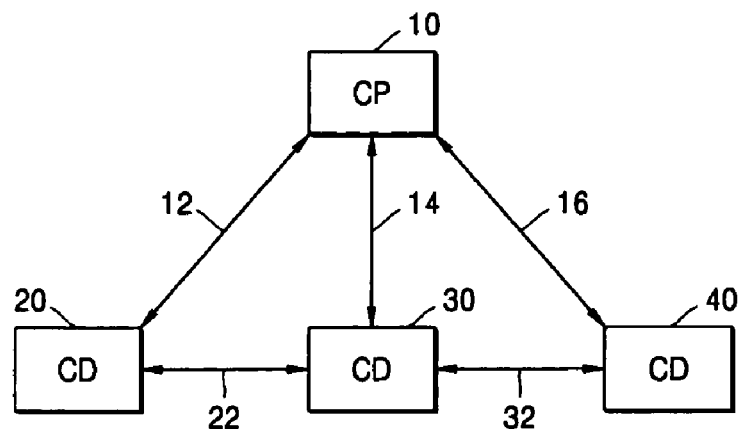
FIG. 1 is a diagram showing a home network according to a universal play and plug (uPnP) protocol.
Figure 2:
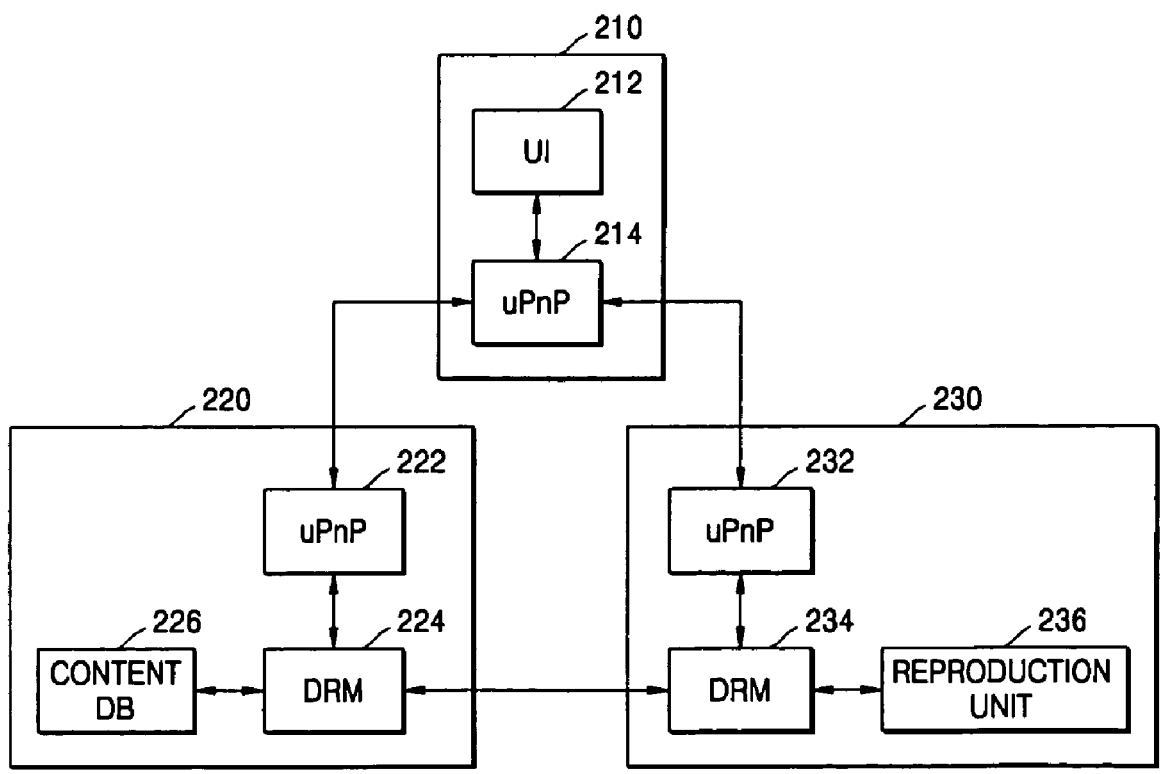
FIG. 2 is a diagram showing a structure in which contents transmission occurring between a control point (CP) and a control device (CD) is performed in digital rights management (DRM) using the uPnP.
Figure 3:
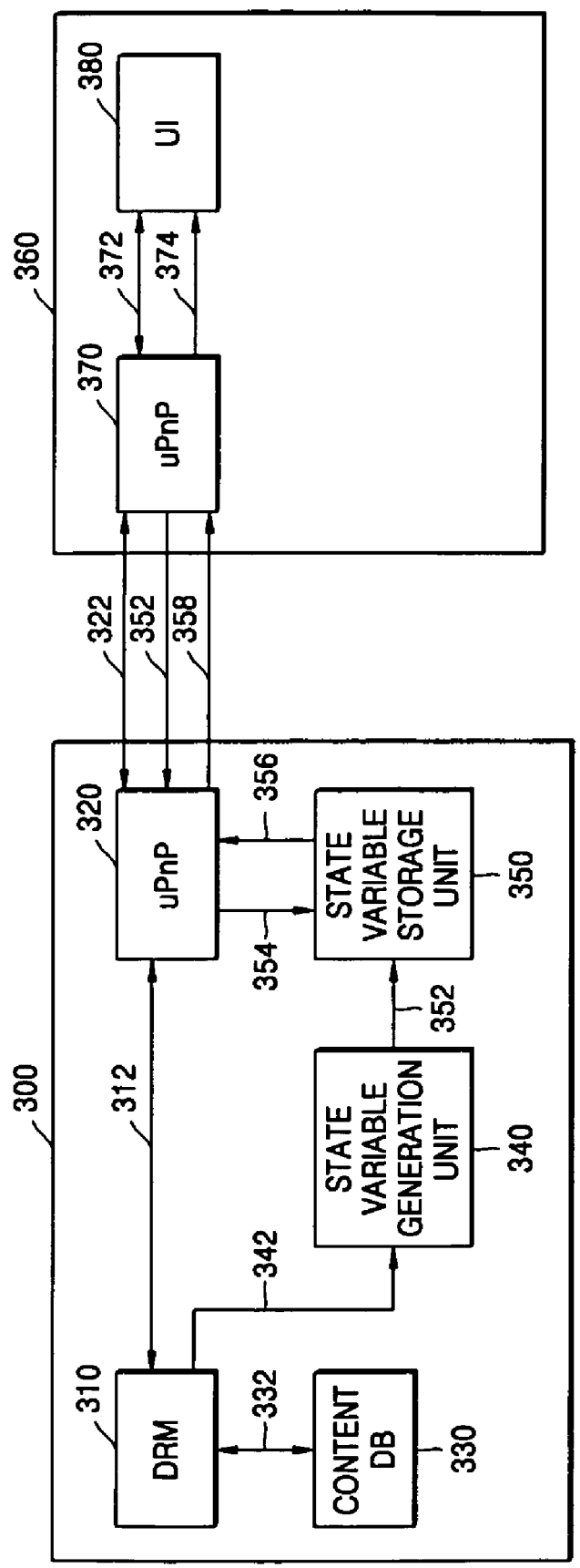
FIG. 3 is a diagram showing the internal structures of a CP and a CD according to an exemplary embodiment of the present invention.

Referring to the diagram of FIG. 3 showing the internal structures of a CD and a CP, the CD 300 according to an exemplary embodiment of the present invention includes a DRM module 310, a uPnP module 320, a contents DB 330, a state variable generation unit 340, and a state variable storage unit 350. The CD 300 of FIG. 3 is a media source.

The DRM module 310 performs digital rights management of the CD 300 in the home network to which the DRM 310 belongs. Digital rights management includes i) device rights management, ii) contents rights management, and iii) rights revocation management.

The device rights management means a series of operations, including i) grant, change, and revocation of qualification of devices belonging to the home network, ii) generation, change, and termination of a domain key obtainable only by the devices belonging to the home network, and iii) confirmation of the qualification of home network devices by using the domain key.

The contents rights management means a series of operations, including i) generation, change and termination of copy control information such as the allowed frequency or permission of copying or reproduction of predetermined contents, and ii) generation of a content key used for encryption of predetermined contents.

Rights revocation management means operations, including determining whether or not devices are illegally copied, and revoking digital rights of all devices that have the same identifier as the identifier determining an illegally copied device.

Rights revocation is performed by using a revocation list including the identifier of an illegally copied device, and additionally by using technologies of certificates or electronic signatures.

Paths 312, 322, 332, and 372 of FIG. 3 show uPnP communication paths for performing an operation to transfer contents from the CD 300 to another device by a user input through the CP 360.

The DRM module 310 is determined by a digital rights management solution used by the DRM module 310. Among digital rights management solutions, there are SmartRight suggested by Thomson, Open Conditional Content Access Management (OCCAM) suggested by Cisco Systems, xCP (extensible content protection) Cluster Protocol suggested by IBM, Digital Transmission Content Protection (DTCP) suggested by Digital Transmission License Administrator (DTLA).

In addition to these digital rights management application programs, the DRM module in the present invention indicates all solutions performing i) device rights management, ii) contents rights management, and iii) rights revocation management. The DRM can be implemented by hardware as well as by application programs.

The uPnP module 320 automatically detects connection to and disconnection from the home network of the device according to the uPnP protocol, automatically updates information on all connected devices, and performs request and response actions between the CD 300, such as a media source and a media renderer, and the CP 360.

Paths (342, 352, 354, 356, 358, and 374) of FIG. 3 indicate paths for performing generation and report of DRM state variables.

The state variable generation unit 340 receives DRM state information 342 from the DRM module 310, and by using the received DRM state information 342, generates a state variable 352. The DRM state information varies according to the type of the DRM solution used by the DRM module. Since all DRM solutions generally include an authentication operation, a key processing operation, and a revocation operation, the DRM state information includes information on whether or not an authentication operation by the DRM module has begun, whether authentication is succeeded or failed, whether or not the key processing operation has begun, and whether the key processing operation is failed or succeeded.

The state variable storage unit 350 stores operation state variables. The uPnP module 370 of the CP 360 transmits a state variable request to the uPnP module 320 of the CD 300 at a predetermined time or period. The uPnP module 320 of the CD 300 receiving the state variable request 352 extracts a current state variable stored in the state variable storage unit 350, and then transmits a response 358 containing the current state variable to the uPnP module 370 of the CP 360. The transmitted current state variable 374 is displayed through the UI 380 to the user.

Referring to FIGS. 4 through 7, the transition process of state variables according to each DRM solution will now be explained.

Figure 4:
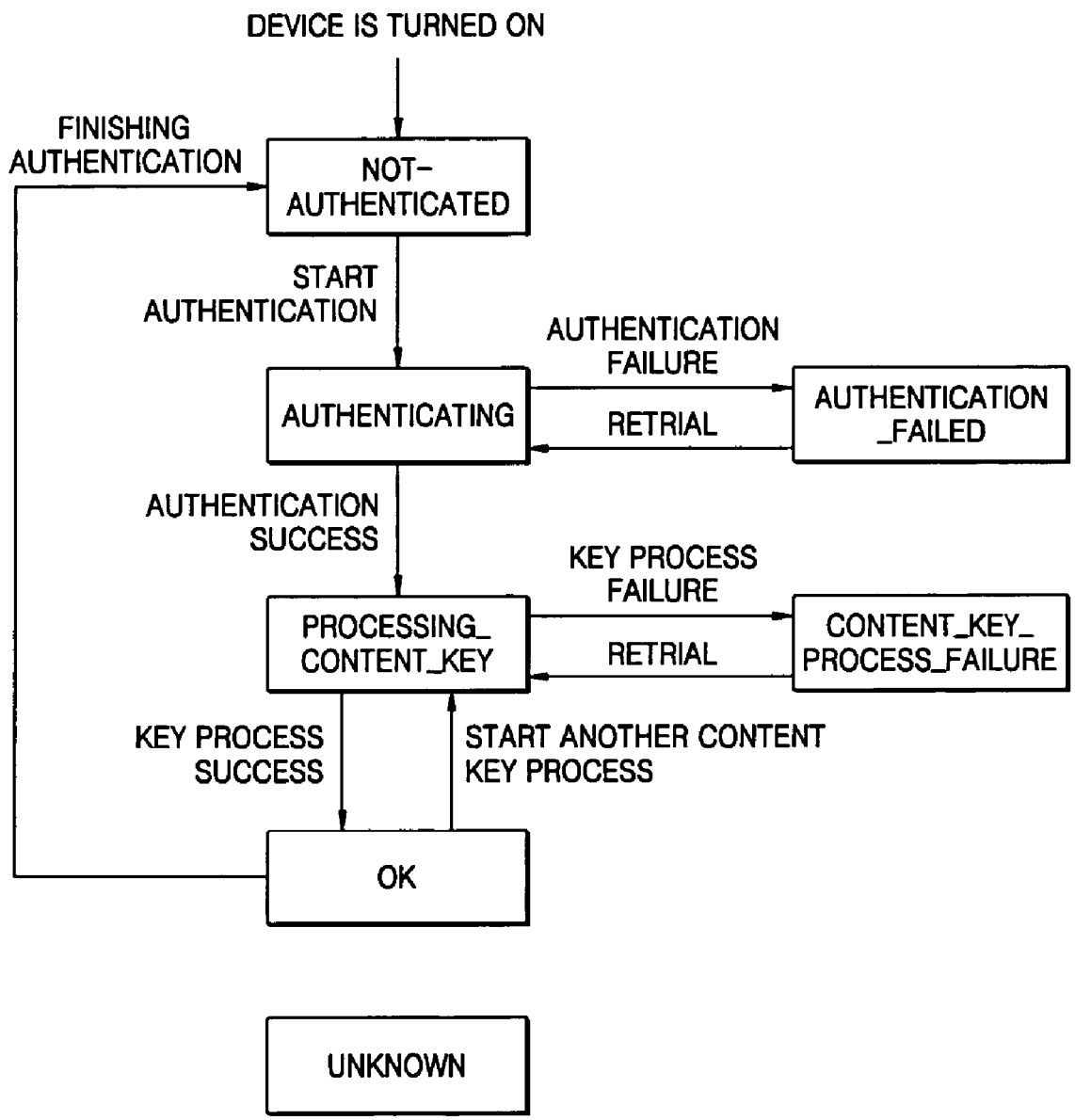
FIG. 4 is a diagram showing the transition of state variables according to an exemplary embodiment of the present invention.

FIG. 4 is a diagram showing the structure of transition of state variables according to an exemplary embodiment of the present invention.

Operation state variables of FIG. 4 includes Not_authenticated, Authenticating, Authentication_failed, Processing_content_key, Content_key_process_failure, Normal_operation (OK), and Unknown.

In FIG. 4, each arrow indicates DRM state information 342 generated by the DRM module 310 according to the operation state of the DRM module 310, and each block indicates an operation state variable 352.

When the CD 300 is turned on, the DRM module 310 is initialized. The state variable generation unit 340 receives completion of initialization of the DRM module 310 as DRM state information, generates a 'Not_authenticated' state variable, and stores it in the state variable storage unit 350.

A reproduction command for a predetermined content by the user is input through the UI 380, and transferred to the DRM module 310 through the uPnP module 370 of the CP 360 and the uPnP module 320 of the CD 300, and then the DRM module 310 performs authentication between the CP 360 and the CD 300 according to a predetermined DRM solution.

If this authentication operation begins, the DRM module 310 generates DRM state information 342 indicating the beginning of authentication, and transmits to the state variable generation unit 340. The state variable generation unit 340 receives the DRM state information 342 indicating the beginning of authentication, and then makes the state variable in the state variable storage unit 350 transition from 'Not_authenticated' to 'Authenticating'. The transition operation of the state variable means an operation updating a state variable stored in the state variable storage unit 350 with another state variable.

In the same manner, the DRM module 310 generates DRM state information according to an operation being performed by the DRM module 310 itself, and the state variable generation unit 340 receives DRM state information from the DRM module 310, and then, according to the structure shown in FIG. 4, the state variable in the state variable storage unit 350 is updated by the state variable corresponding to a block indicated by each DRM state information.

In FIG. 4, a 'Normal_operation (OK)' state variable indicates the successful completion of the key processing operation as well as that of the authentication operation.

An 'Unknown' state variable indicates a state variable generated by the state variable generation unit when the DRM state information 342 is not any type of the DRM state information shown in FIG. 4.

The DRM state variable structure when the DRM solution is digital transmission content protection (DTCP) is shown in FIG. 4. According to DTCP, authentication for a CD is performed for respective contents. Accordingly, with respect to DTCP, if an authentication operation for a device is completed, a 'Key_processing' state variable is immediately generated without generating other additional state variables.

Figure 5:
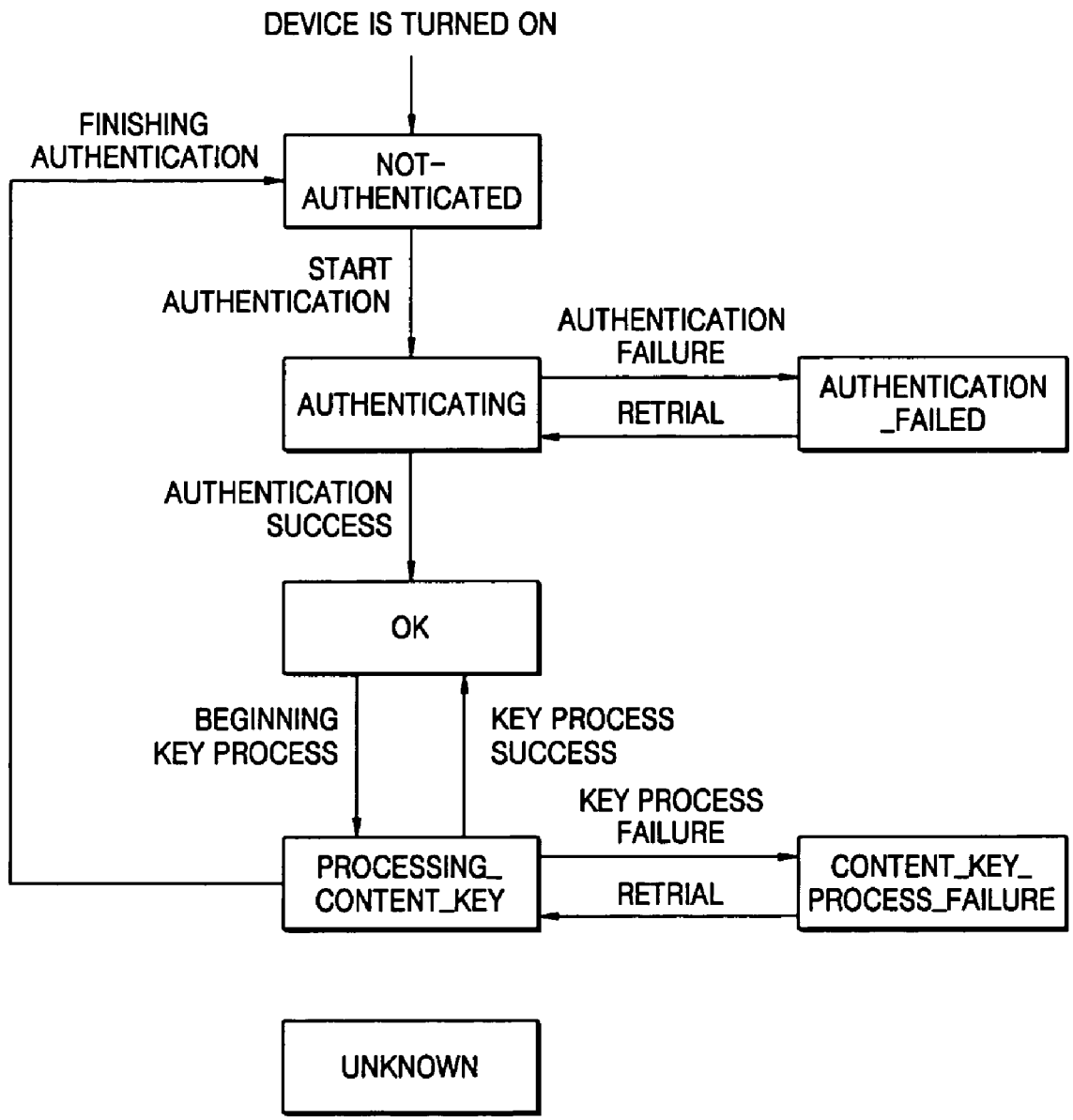
FIG. 5 is a diagram showing the transition of state variables according to another exemplary embodiment of the present invention.

FIG. 5 is a diagram showing the structure of transition of state variables according to another exemplary embodiment of the present invention.

The state transition structure of FIG. 5 shows a case where the authentication operation and the key processing operation by the DRM module 310 are separated.

That is, if DRM state information indicating authentication success is received by the state variable generation unit 340 during 'Authenticating' state, the state variable is changed to 'Normal_operation (OK)'. In other words, even when an authentication operation is successfully completed, the state variable is updated with 'Normal_operation (OK)' unlike FIG. 4. Accordingly, unless a reproduction command of predetermined contents by a user input is input, 'Normal_operation (OK)' is maintained till DRM state information 342 indicating completion of authentication is received by the state variable generation unit 340.

Therefore, the state transition structure of FIG. 5 is appropriate to a DRM solution of the DRM module 310 in which an authentication operation is performed separately from a key processing operation; that is, an authentication operation is performed for a predetermined device while key processing is performed for contents separately from the device.

Figure 6:
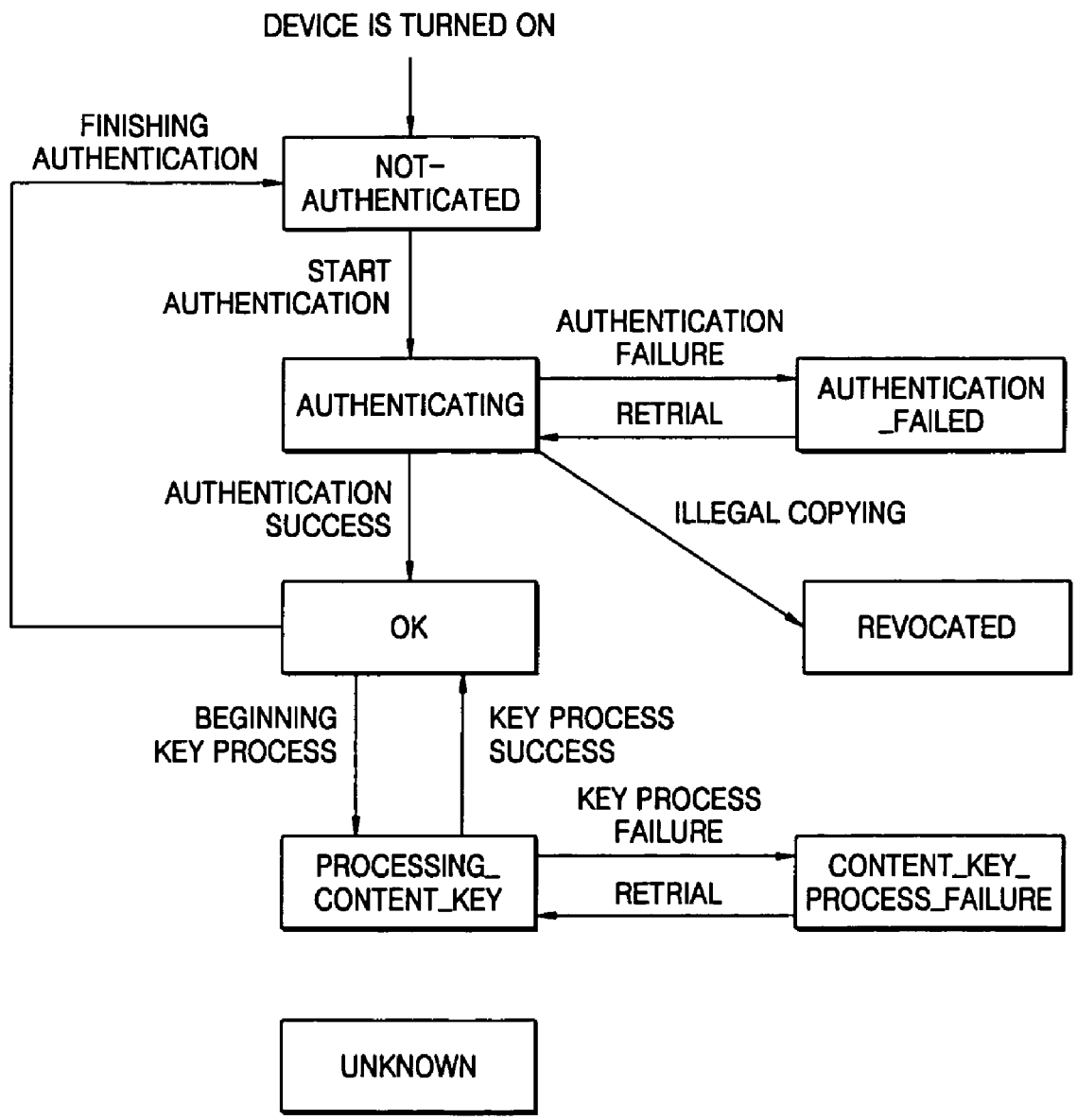
FIG. 6 is a diagram showing the transition of state variables according to still another exemplary embodiment of the present invention.

FIG. 6 is a diagram showing the structure of transition of state variables according to still another exemplary embodiment of the present invention.

The state transition structure of FIG. 6 is the same as that of FIG. 5 except for the 'Revocated' state variable. The 'Revocated' state variable is generated when it is determined during an authentication operation for a device, that a device is illegally copied. Accordingly, the state transition structure of FIG. 6 is appropriate when the DRM solution of the DRM module 310 performs a revocation function.

In another embodiment of the present invention, unlike as shown in FIG. 3, a 'Revocated' state variable may be transferred to the CP, not by a response to a state variable request, but by other methods. This will now be explained.

Figure 7:
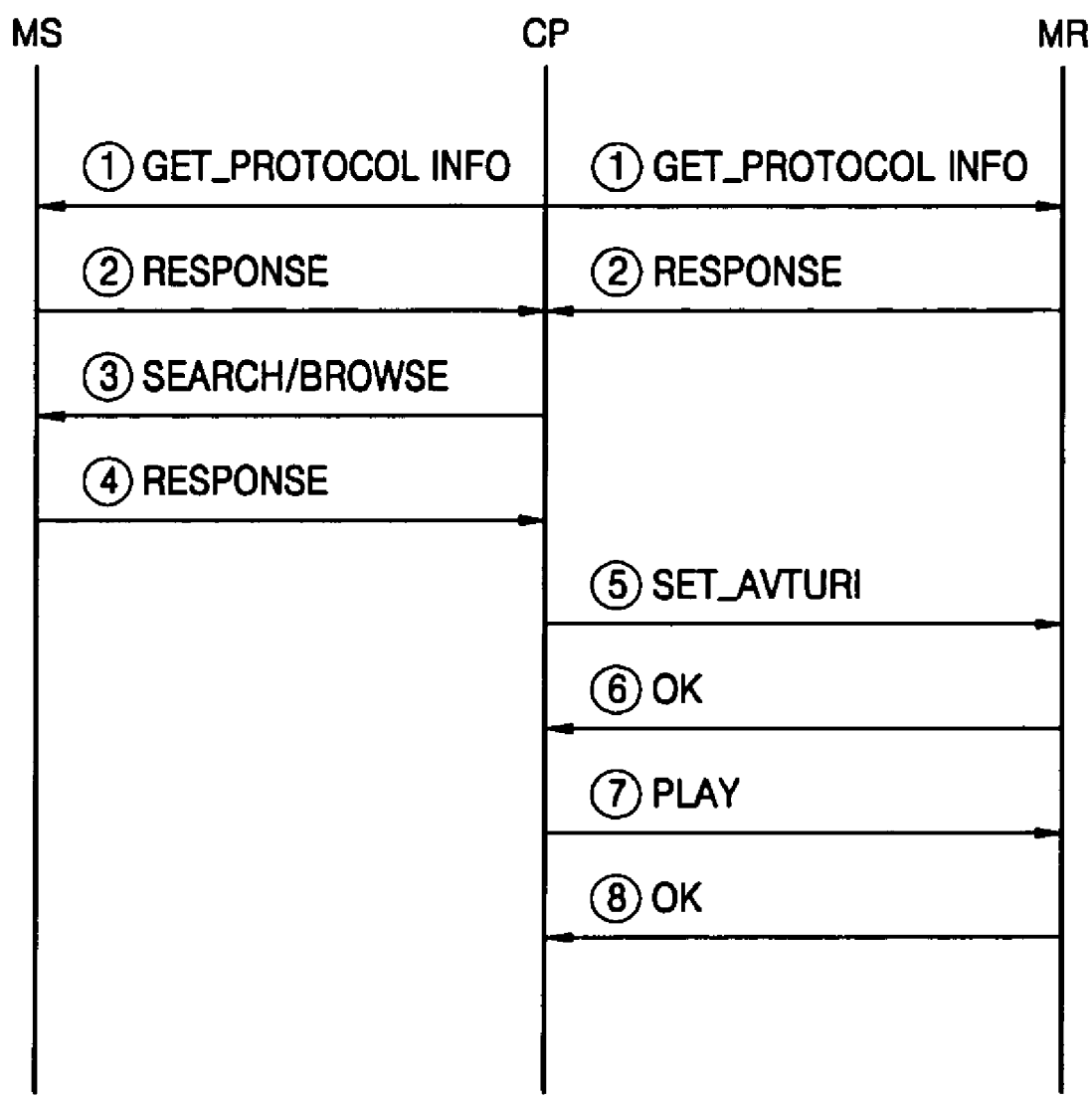
FIG. 7 is a diagram showing a method for reporting a rights revocation state variable to a CP according to an exemplary embodiment of the present invention.

FIG. 7 is a diagram showing a method for reporting a rights revocation state variable to a CP according to an exemplary embodiment of the present invention.

In the embodiment of FIG. 7, a 'Revocated' state variable is transferred from the CD to the CP through 'get_protocol Info' that is one of uPnP actions.

First, in operation ①, the CP transfers get_protocol Info command to the CD according to the uPnP protocol. The CD includes both a media source (MS) and a media renderer (MR). The transfer of get_protocol Info command is performed between the uPnP module of the CP and the uPnP module of the CD.

In operation ②, each CD, that is, the media source (MS) and the media renderer (MR), transfers a response to the get_protocol Info command, to the CP. This response contains 'Revocated' state variable indicating whether or not the media source or the media renderer is illegally copied. The 'Revocated' state variable is generated by the state variable generation unit of the CD.

In operation ③, the CP transmits a command to search and browse predetermined contents, to the media source, and in operation ④, the media source, as a response to the command, transmits contents information containing an identifier indicating predetermined contents.

In operations ⑤ through ⑧, addressing and reproduction commands for the corresponding contents are performed between the CP and the media renderer such that reproduction of the contents is performed.

In operations ⑤ and ⑥, the media renderer (MR) receives the media source storing the contents and the location of the contents through SET_AVTURI command from the CP, and in operations ⑦ and ⑧, receives the corresponding contents from the media source (MS) through Play command from the CP, and reproduces the contents.

In FIG. 7, operations ① and ② may be performed after operations ③ and ④. In this case, after searching and browsing predetermined contents are performed, get_protocol Info command is transmitted from the CP to the CD.

Meanwhile, the method for reporting the operation state of digital rights management according to the present invention can be written as computer programs. Codes and code segments forming the program can be easily inferred by a computer programmer in the field of the present invention. Also, the program implements reporting the state of digital rights management by being stored in computer readable media, read and executed by a computer. The computer readable media include magnetic storage media, optical recording media, and carrier wave media.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention as described above, the control point having a user interface in a home network is made to allow the operation state of digital rights management, which is performed by the control device, to be displayed to the user such that the user can smoothly deal with error states of the home network.

What is claimed is:

1. An apparatus for reporting an operation state of digital rights management (DRM) of a control device to a control point in a home network formed with the at least one control device and the control point, the apparatus comprising:

a processor;

a DRM module which performs DRM;

a state variable generation unit which receives DRM operation state information indicating the state of a DRM process currently operating, from the DRM module, and generates DRM state variables based on the received DRM state information; and a universal plug and play (uPnP) module which, by using a uPnP protocol, transmits the state variables generated by the state variable generation unit to the control point, wherein if the DRM state information indicates that authentication by the DRM module is successful, the state variable generation unit causes an authenticating state variable, which indicates that an authentication operation by the DRM module is performed, to change to a normal-operation state variable which indicates that the DRM module is normally operating, and if the DRM state information indicates that the authentication by the DRM module has failed, the state variable generation unit causes the authenticating state variable to change to an authentication-failed state variable which indicates that a result of the authentication by the DRM module is a failure.

2. The apparatus of claim 1, wherein the DRM state information indicates at least one of authentication beginning, authenticating, authentication failure, and authentication success by the DRM module.

3. The apparatus of claim 2, wherein if the control device is a media source, the DRM state information is generated if contents in the media source are output to another control device, and if the control device is a media renderer, the DRM state information is generated if contents in the media renderer are input to the media renderer or are rendered.

4. The apparatus of claim 1, wherein the DRM state information indicates at least one of key processing, key processing failure, and key processing success by the DRM module.

5. The apparatus of claim 1, wherein the DRM state information is transmitted to the control point by using a uPnP protocol.

6. The apparatus of claim 5, wherein the DRM state information indicates whether rights of a home network device to which the DRM module is installed is revocated.

7. The apparatus of claim 1, wherein if the DRM state information indicates that the DRM module has begun authentication, the state variable generation unit causes the not-authenticated state variable to change to the authenticating state variable.

8. The apparatus of claim 1, further comprising:
a state variable storage unit which stores the state variables, wherein, in response to a state variable search request from the control point, the uPnP module searches for a state variable stored in the state variable storage unit according to a uPnP protocol, and transmits the state variable to the control point.

9. The apparatus of claim 8, wherein the state variable is transmitted to the at least one control device as a response to get_protocol Info command by the control point.

10. An apparatus for reporting an operation state of digital rights management (DRM) of a control device to a control point in a home network formed with the at least one control device and the control point, the apparatus comprising:
a processor;
a DRM module which performs DRM;
a state variable generation unit which receives DRM operation state information indicating the state of a DRM process currently operating, from the DRM module, and generates DRM state variables based on the received DRM state information; and
a universal plug and play (uPnP) module which, by using a uPnP protocol, transmits the state variables generated by the state variable generation unit to the control point,
wherein when the DRM state information indicates an authentication finishing condition of the at least one control device, the state variable generation unit causes a normal-operation state variable, which indicates that the DRM module is normally operating, to change to a not-authenticated state variable which indicates that the at least one control device including the DRM module is turned on.

11. An apparatus for reporting an operation state of digital rights management (DRM) of a control device to a control point in a home network formed with the at least one control device and the control point, the apparatus comprising:
a processor;
a DRM module which performs DRM;
a state variable generation unit which receives DRM operation state information indicating the state of a DRM process currently operating, from the DRM module, and generates DRM state variables based on the received DRM state information; and
a universal plug and play (uPnP) module which, by using a uPnP protocol, transmits the state variables generated by the state variable generation unit to the control point,
wherein the state variable generation unit further generates:
a key-processing state variable which indicates that a key processing operation by the DRM module is performed; and
a key-processing-failure state variable which indicates that the key-processing operation by the DRM module is a failure.

12. The apparatus of claim 11, wherein if the DRM operation state information indicates that the authentication operation by the DRM module is successful, the state variable generation unit causes an authenticating state variable, which indicates that an authentication operation by the DRM module is performed, to change to the key-processing state variable, and if the DRM state information indicates that the authentication operation by the DRM module has failed, the state variable generation unit causes the key-processing state variable to change to an authentication-failed state variable which indicates that a result of the authentication by the DRM module is a failure.

13. The apparatus of claim 11, wherein if the DRM state information indicates that the DRM module has begun key-processing, the state variable generation unit causes the normal-operation state variable to change to the key-processing state variable.

14. The apparatus of claim 11, wherein if the DRM state information indicates that the key-processing operation by the DRM module is successful, the state variable generation unit causes the key-processing state variable to change to a normal-operation state variable, which indicates that the DRM module is normally operating, and if the DRM state information indicates that the key-processing operation by the DRM module has failed, the state variable generation unit causes the key-processing state variable to change to the key-processing-failure state variable.

15. A method for reporting the operation state of digital rights management (DRM) of a control device to a control point in a home network formed with the control device and the control point, the method comprising:
performing, by a DRM module, DRM;
generating DRM state information determining a current DRM operation currently operating;
generating, by the control device, a DRM state variable based on the DRM state information; and
transmitting the generated DRM state variable to the control point by using a universal plug and play (uPnP) protocol,
wherein if the DRM state information indicates that the authentication by the DRM module is successful, the generating the DRM state variable comprises causing an authenticating state variable, which indicates that an authentication operation by the DRM module is performed, to change to a normal-operation state variable which indicates that the DRM module is normally operating, and if the DRM state information indicates that the authentication by the DRM module has failed, the generating the DRM state variable comprises causing the authenticating state variable to change to a authentication-failed state variable which indicates that a result of the authentication by the DRM module has failed.

16. The method of claim 15, wherein the generating of the DRM state information is performed while performing the DRM.

17. The method of claim 15, wherein the DRM state information indicates at least one of authentication beginning, authenticating, authentication failure, and authentication success by the DRM module.

18. The method of claim 17, wherein the DRM state information indicates at least one of key processing, key processing failure, and key processing success by the DRM module.

19. The method of claim 17, wherein if the control device is a media source, the DRM state information is generated if contents in the media source are output to another control device, and if the control device is a media renderer, the DRM state information is generated whenever contents in the media renderer are input to the media renderer or rendered.

20. The method of claim 15, wherein the DRM state information is transmitted to the control point by using a uPnP protocol.

21. The method of claim 20, wherein the DRM state information indicates whether at least one right of a home network device to which a DRM module is installed is revoked.

22. The method of claim 15, wherein if the DRM state information indicates that the DRM module has begun authentication, the generating of the DRM state variable comprises making a not-authenticated state variable, which indicates that the control device including the DRM module is turned on, to change to the authenticating state variable.

23. The method of claim 15, further comprising:

storing the DRM state variable, wherein in transmitting the DRM state variable, the DRM state variable stored in the state variable storage unit is transmitted to the control point in response to a state variable search request by the control point.

24. The method of claim 23, wherein the DRM state variable is transmitted to the control point in response to a get_protocol Info command from the control point.

25. A method for reporting the operation state of digital rights management (DRM) of a control device to a control point in a home network formed with the control device and the control point, the method comprising:

performing, by a DRM module, DRM;

generating DRM state information determining a current DRM operation currently operating;

generating, by the control device, a DRM state variable based on the DRM state information; and transmitting the generated DRM state variable to the control point by using a universal plug and play (uPnP) protocol, wherein when the DRM state information indicates an authentication finishing condition of the control device, the generating the DRM state variable comprises making a normal-operation state variable, which indicates that the DRM module is normally operating, to change to a not-authenticated state variable which indicates that the control device including the DRM module is turned on.

26. A method for reporting the operation state of digital rights management (DRM) of a control device to a control point in a home network formed with the control device and the control point, the method comprising:

performing, by a DRM module, DRM;

generating DRM state information determining a current DRM operation currently operating;

generating, by the control device, a DRM state variable based on the DRM state information; and transmitting the generated DRM state variable to the control point by using a universal plug and play (uPnP) protocol, wherein the generating the DRM state information further comprises generating:

a key-processing state variable which indicates that a key processing operation by the DRM module is performed; and a key-processing-failure state variable which indicates that the key-processing operation by the DRM module is a failure.

27. The method of claim 26, wherein if the DRM state information indicates that the authentication operation by the DRM module is successful, the generating the DRM state variable comprises causing an authenticating state variable, which indicates that an authentication operation by the DRM module is performed, to change to the key-processing state variable, and if the DRM state information indicates that the authentication operation by the DRM module has failed, the generating the DRM state variable comprises causing the key-processing state variable to change to an authentication-failed state variable which indicates that a result of the authentication by the DRM module is a failure.

28. The method of claim 26, wherein when the DRM state information indicates that the DRM module has begun key-processing, the generating the DRM state variable comprises making a normal-operation state variable, which indicates that the DRM module is normally operating, to change to the key-processing state variable.

29. The method of claim 26, wherein if the DRM state information indicates that the key-processing operation by the DRM module is successful, the generating the DRM state variable comprises causing the key-processing state variable to change to a normal-operation state variable, which indicates that the DRM module is normally operating, and if the DRM state information indicates that the key-processing operation by the DRM module is a failure, the generating the DRM state variable comprises causing the key-processing state variable to change to the key-processing-failure state variable.

* * * * *